United States Patent
Huang et al.

(10) Patent No.: US 12,282,352 B2
(45) Date of Patent: Apr. 22, 2025

(54) ELECTRONIC DEVICE FOR PERFORMING CLOCK MANAGEMENT BY USING CLOCK COUNTERS ALLOCATED AT DIFFERENT POWER DOMAINS AND ASSOCIATED METHOD

(71) Applicant: Airoha Technology Corp., Hsinchu (TW)

(72) Inventors: I-Ping Huang, Hsinchu (TW); Ching-An Chung, Miaoli County (TW)

(73) Assignee: Airoha Technology Corp., Hsinchu (TW)

( * ) Notice: Subject to any disclaimer, the term of this patent is extended or adjusted under 35 U.S.C. 154(b) by 29 days.

(21) Appl. No.: 18/139,939

(22) Filed: Apr. 26, 2023

(65) Prior Publication Data
US 2024/0361798 A1  Oct. 31, 2024

(51) Int. Cl.
*G06F 1/08* (2006.01)
(52) U.S. Cl.
CPC .................................. *G06F 1/08* (2013.01)
(58) Field of Classification Search
CPC ............................................ G08F 1/08
See application file for complete search history.

(56) References Cited

U.S. PATENT DOCUMENTS

2019/0302832 A1   10/2019  Morgan
2021/0055963 A1   2/2021  An

FOREIGN PATENT DOCUMENTS

CN   109933846 A       6/2019
CN   115696530 A   *   2/2023

* cited by examiner

*Primary Examiner* — Stefan Stoynov
(74) *Attorney, Agent, or Firm* — Winston Hsu

(57) ABSTRACT

An electronic device includes a first circuit block and a second circuit block. The first circuit block is allocated in a first power domain, and includes a first clock counter and an updating circuit. The first clock counter is arranged to generate a first counter value according to a first reference clock. The updating circuit is arranged to receive a second counter value, and update the first counter value according to the second counter value. The second circuit block is allocated in a second power domain, and includes a second clock counter arranged to generate the second counter value according to a second reference clock. The first power domain and the second power domain are controlled independently.

12 Claims, 3 Drawing Sheets

ELECTRONIC DEVICE FOR PERFORMING CLOCK MANAGEMENT BY USING CLOCK COUNTERS ALLOCATED AT DIFFERENT POWER DOMAINS AND ASSOCIATED METHOD

BACKGROUND OF THE INVENTION

1. Field of the Invention

The present invention relates to clock generation, and more particularly, to a communication device for performing clock management by using clock counters allocated at different power domains and an associated method.

2. Description of the Prior Art

Regarding synchronization between different communication devices, each communication device relies on its free-running clock (which is also known as the native clock). For example, one of the key objects within each Bluetooth device is the internal Bluetooth native clock. Bluetooth devices have to synchronize with each other. Specifically, the Bluetooth native clock is referenced to determine the timing and hopping of the transceiver. The Bluetooth native clock is very important for the Bluetooth transceiver as it is involved in timing a number of important events without which communication cannot be possible. For example, the Bluetooth native clock may be implemented with a native clock counter. Since a counter value generated from the native clock counter represents a clock value that can be used to determine the transceiver timing, updating the counter value continuously is indispensable to maintaining the communication between Bluetooth devices. For battery-powered Bluetooth devices such as earbuds, mice, and keyboards, they are expected to satisfy long-term use requirements. Due to limited battery capacity, a Bluetooth chip employed by the battery-powered Bluetooth device should be properly designed to save power as much as possible. How to achieve power saving of Bluetooth devices while still maintaining the communication between Bluetooth devices becomes a challenging task for a Bluetooth chip designer.

SUMMARY OF THE INVENTION

One of the objectives of the claimed invention is to provide to an electronic device for performing clock management by using clock counters allocated at different power domains and an associated method.

According to a first aspect of the present invention, an exemplary electronic device is disclosed. The exemplary electronic device includes a first circuit block and a second circuit block. The first circuit block is allocated in a first power domain, and includes a first clock counter and an updating circuit. The first clock counter is arranged to generate a first counter value according to a first reference clock. The updating circuit is arranged to receive a second counter value, and update the first counter value according to the second counter value. The second circuit block is allocated in a second power domain, and includes a second clock counter arranged to generate the second counter value according to a second reference clock. The first power domain and the second power domain are controlled independently.

According to a second aspect of the present invention, an exemplary clock management method is disclosed. The exemplary clock management method includes: using a first clock counter allocated in a first power domain for generating a first counter value according to a first reference clock; using a second clock counter allocated in a second power domain for generating a second counter value according to a second reference clock; using an updating circuit allocated in the first power domain for receiving the second counter value and updating the first counter value according to the second counter value; and controlling the first power domain and the second power domain independently.

According to a third aspect of the present invention, an exemplary electronic device is disclosed. The exemplary electronic device includes a first clock counter and a second clock counter. The first clock counter is arranged to provide a time information for determining operation timing of the electronic device according to a first reference clock during a communication period of the electronic device. The second clock counter is arranged to provide the time information according to a second reference clock during a period out of the communication period, wherein a frequency of the first reference clock is higher than a frequency of the second reference clock.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
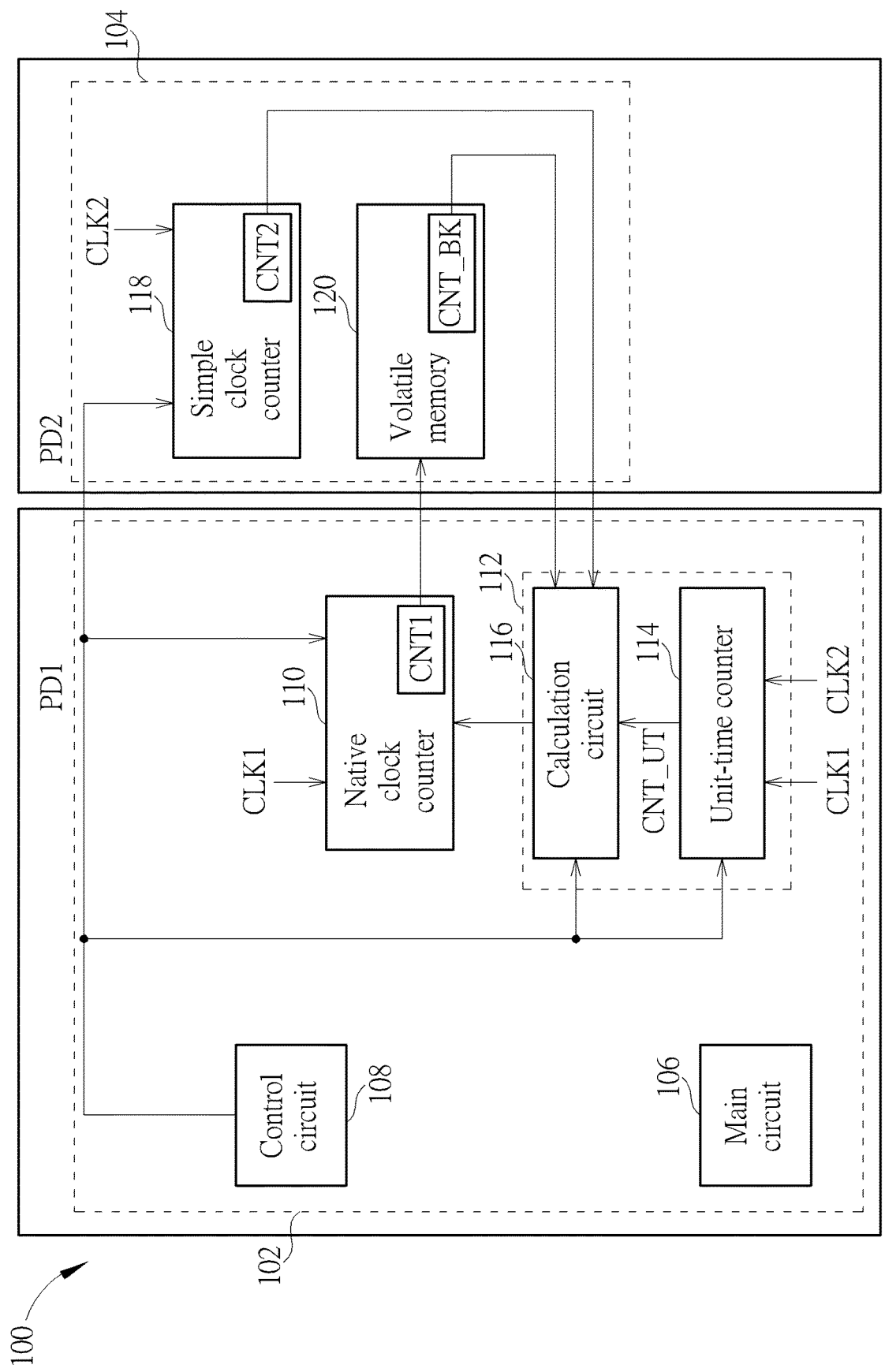
FIG. 1 is a diagram illustrating a first electronic device according to an embodiment of the present invention.

FIG. 1 is a diagram illustrating a first electronic device according to an embodiment of the present invention. By way of example, but not limitation, the electronic device 100 may be a wireless communication device (e.g., a Bluetooth device), and may employ the proposed clock management method for maintaining a native clock (e.g., a Bluetooth native clock) needed for achieving synchronization between the electronic device 100 and another electronic device (e.g., a peer Bluetooth device). The electronic device 100 includes a plurality of circuit blocks allocated in different power domains that are controlled independently. As shown in FIG. 1, the electronic device 100 includes a circuit block 102 allocated in one power domain PD1 and a circuit block 104 allocated in another power domain PD2. The power domains PD1 and PD2 are controlled independently. For example, the power domains PD1 and PD2 may be both switched on, thus enabling a full power mode of the electronic device 100. For another example, the power domain PD1 may be switched off and the power domain PD2 may be switched on, thus enabling a low power mode of the electronic device 100. That is, switch of the power domain PD1 is independent of that of the power domain PD2. In this embodiment, the power domain PD2 remains switched on when the power domain PD1 is switched on. However, this is for illustrative purposes only, and is not meant to be a limitation of the present invention. When the power domain PD1 is switched on, the power domain PD2 may remain switched on or may be switched off, depending upon actual design considerations.

The circuit block 102 includes a main circuit 106, a control circuit 108, a native clock counter 110, and an updating circuit 112, where the updating circuit 112 includes a unit-time counter 114 and a calculation circuit 116. The circuit block 104 includes a simple clock counter 118 and a volatile memory 120. For example, the volatile memory 120 may be implemented by random access memories (RAMs) or registers. The main circuit 106 is arranged to deal with main functions (for example, functions for audio processing) of the electronic device 100. The control circuit 108 is arranged to control the native clock management. For example, the control circuit 108 may generate a control signal to start or stop the native clock counter 110, may generate another control signal to start or stop the simple clock counter 118, and may generate yet another control signal to enable or disable the updating circuit 112.

The native clock counter 110 is arranged to generate a counter value CNT1 according to a reference clock CLK1, where the counter value CNT1 increments per clock cycle of the reference clock CLK1. A native clock (i.e., a free-running clock) may be implemented by the native clock counter 110, such that the counter value CNT1 may be treated as a clock value that can be referenced for determining the transceiver timing. In a case where the electronic device 100 is a Bluetooth device, a Bluetooth native clock is implemented by the native clock counter 110.

The simple clock counter 118 is arranged to generate a counter value CNT2 according to a reference clock CLK2, where the counter value CNT2 increments per clock cycle of the reference clock CLK2.

The updating circuit 112 is arranged to receive the counter value CNT2 from the simple clock counter 118, and update the counter value CNT1 of the native clock counter 110 according to the counter value CNT2 of the simple clock counter 118.

In this embodiment, the electronic device 100 may switch between the full power mode and the low power mode. The circuit components in the same power domain use the same power supply during a normal operation, and can be switched on or off at the same time. Hence, when the electronic device 100 operates under the full power mode, the power domain PD1 is switched on to supply power to all circuit components of the circuit block 102; and when the electronic device 100 operates under the low power mode, the power domain PD1 is switched off to completely eliminate current leakage of the circuit block 102 for power saving. When the power domain PD1 is switched off for power saving, the native clock counter 110 stops updating the counter value CNT1. However, updating the counter value CNT1 is indispensable to maintaining the communication between electronic devices (e.g., Bluetooth devices).

In a case where the electronic device 100 is a Bluetooth transmitter, the electronic device 100 leaves the full power mode (e.g., normal mode) and enters the low power mode (e.g., power saving mode) when there are no packets to be transmitted, waits for a period of time (i.e., a period out of the communication period) under the low power mode, and then leaves the low power mode and enters the full power mode again for transmitting packets to a Bluetooth receiver. In another case where the electronic device 100 is a Bluetooth receiver, the electronic device 100 leaves the full power mode (e.g., normal mode) and enters the low power mode (e.g., power saving mode) when there are no packets to be received, waits for a period of time (i.e., a period out of the communication period) under the low power mode, and then leaves the low power mode and enters the full power mode again for receiving packets from a Bluetooth transmitter. No matter whether the electronic device 100 is a Bluetooth transmitter or a Bluetooth receiver, a counter is needed to count the period of time, being a period in which there is no packet transaction between the Bluetooth transmitter and the Bluetooth receiver. For example, during the period of time in which the electronic device 100 operates under the low power mode for power saving, the electronic device 100 is idle and waits for next events.

To address this issue, the present invention proposes allocating the circuit block 104 (which includes the simple clock counter 118) at another power domain PD2, where the power domain PD2 remains switched on for allowing the simple clock counter 118 to update its counter value CNT2 during a period in which the power domain PD1 is switched off for power saving (e.g., a period in which the electronic device 100 is idle and waits for next events). In this way, the counter value CNT2 can provide timing information that can be used to properly update the counter value CNT1 to a correct value at the time the power domain PD1 is switched on again (i.e., the native clock counter 110 is started again). For example, the native clock counter 110 is arranged to provide a time information for determining operation timing of the electronic device 100 according to the reference clock CLK1 during a communication period of the electronic device 100, and the simple clock counter 118 is arranged to provide the time information according to the reference clock CLK2 during a period out of the communication period.

In this embodiment, a frequency of the reference clock CLK1 is different from a frequency of the reference clock CLK2. For example, the frequency of the reference clock CLK2 is lower than the frequency of the reference clock CLK1. Hence, compared to the native clock counter 110 operating under the full power mode, the simple clock counter 118 operating under the low power mode has lower power consumption due to the lower reference clock frequency. In some embodiments of the present invention, the reference clock CLK1 used by the native clock counter 110 under the full power mode may be implemented by a high-power clock with good accuracy (e.g., 26 Mhz crystal clock), and the reference clock CLK2 used by the simple clock counter 118 under the low power mode may be implemented by a low-power clock with less accuracy (e.g., 32 Khz oscillator clock).

Since the frequency of the reference clock CLK1 is different from (e.g., higher than) the frequency of the reference clock CLK2, the updating circuit 112 is further arranged to deal with unit conversion between counter values CNT1 and CNT2. The unit-time counter 114 is arranged to generate a unit-time counter value CNT_UT as a conversion factor from the counter value CNT2 to the counter value CNT1 by counting a unit time (i.e., one clock cycle) of the reference clock CLK2 according to the reference clock CLK1. That is, the unit-time counter 114 may act as a frequency counter for obtaining the unit-time counter value CNT_UT which is indicative of the number of clock cycles of the reference clock CLK1 that occur within one clock cycle of the reference clock that is, CNT_UT=N clock cycles of CLK1/1 clock cycle of CLK2, where N>1. The calculation circuit 116 is arranged to update the counter value CNT1 according to the counter value CNT2 and the unit-time counter value CNT_UNI (e.g., CNT1=CNT1+CNT2×CNT_UI).

Since the reference clock CLK2 may be implemented by a low-power clock with less accuracy, the unit-time counter 114 can use the high-precision reference clock CLK1 (e.g., a crystal clock) to measure the length of one latest clock cycle of the reference clock CLK2 in terms of clock cycles of the high-precision reference clock CLK1 just before the power domain PD1 is switched off, thereby improving the accuracy of unit conversion between the counter values CNT1 and CNT2 after the power domain PD1 is switched on again.

When the power domain PD1 is switched off, the native clock counter 110 is powered down and then loses the counter value CNT1. In this embodiment, the volatile memory 120 is allocated in the power domain PD2 (which remains switched on during a period in which the power domain PD1 is switched off for power saving), and is arranged to store a backup CNT_BK of the counter value CNT1 generated by the native clock counter 110 (i.e., CNT_BK=CNT1) before a start time of the period (i.e., before the power domain PD1 is switched off), and the updating circuit 112 (particularly, calculation circuit 116 of updating circuit 112) is further arranged to restore the counter value CNT1 by reading the backup CNT_BK from the volatile memory 120 after an end time of the period (i.e., after the power domain PD1 is switched on again). With the help of the backup CNT_BK (which is the last counter value CNT1 generated before the native clock counter 110 is powered down) and the counter value CNT2 (which is continuously updated during the period in which the native clock counter 110 is powered down), the counter value CNT1 can be properly updated as if the native clock counter 110 was not powered down. To put it simply, the power domain PD1 can be switched off for power saving, and the simple clock counter 118 in the power domain PD2 can help the native clock counter 110 to have an updated counter value CNT1 needed for maintaining the communication after the power domain PD1 is switched on again.

Compared to a circuit design with the native clock counter 110 but no simple clock counter 118, the proposed circuit design having both of the native clock counter 110 and the simple clock counter 118 can have lower power consumption due to the fact that the low-power simple clock counter 118 can be used to provide timing information when the high-power native clock counter 110 is powered down. In addition, compared to a circuit design having the circuit block 102 (which includes the native clock counter 110) and the circuit block 104 (which includes the simple clock counter 118) both allocated in the same power domain, the proposed circuit design having the circuit block 102 (which includes the native clock counter 110) and the circuit block 104 (which includes the simple clock counter 118) allocated in different power domains can have lower power consumption due to the fact that the circuit block 102 (which includes the native clock counter 110) can be powered down to completely eliminate the leakage current.

Figure 2:
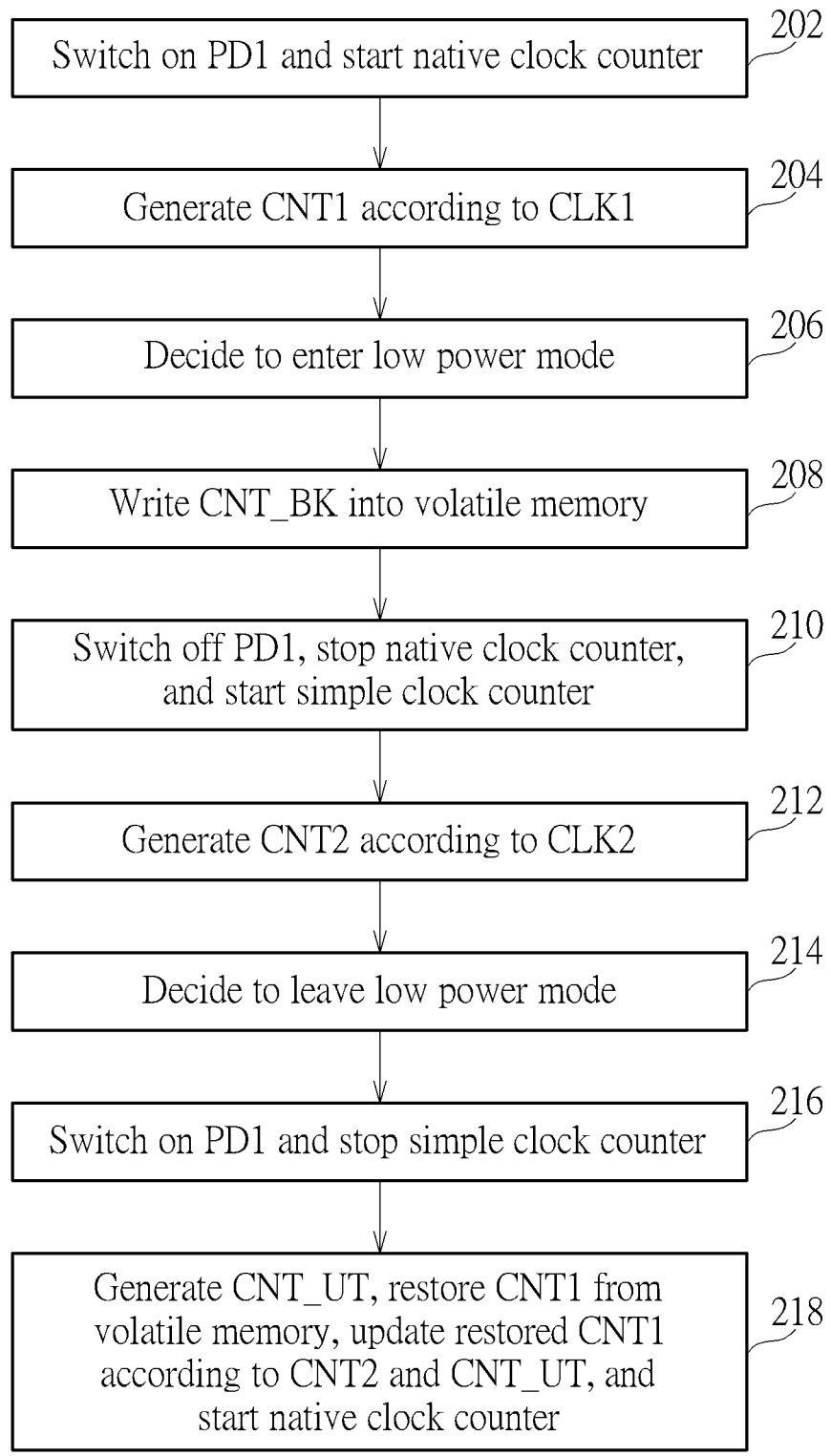
FIG. 2 is a flowchart illustrating a clock management method according to an embodiment of the present invention.

Please refer to FIG. 2 in conjunction with FIG. 1. FIG. 2 is a flowchart illustrating a clock management method according to an embodiment of the present invention. The clock management method may be employed by the electronic device 100 shown in FIG. 1. Provided that the result is substantially the same, the steps are not required to be executed in the exact order shown in FIG. 2. At step 202, the electronic device 100 enters the full power mode by switching on the power domain PD1, and starts the native clock counter 110. At step 204, the native clock counter 110 generates and updates the counter value CNT1 (which acts as a clock value of a native clock, such as a Bluetooth native clock) according to the reference clock CLK1. At step 206, the electronic device 100 decides to enter the low power mode for power saving. At step 208, the native clock counter 110 writes the backup CNT_BK of the current counter value CNT1 into the volatile memory 120. At step 210, the electronic device 100 enters the low power mode by switching off the power domain PD1, stops the native clock counter 110, and starts the simple clock counter 118, where the power domain PD2 remains switched on during a period in which the power domain PD1 is switched off for power saving. Specifically, the electronic device 100 stops the native clock counter 110 when switching from the full power mode to the low power mode. At step 212, the simple clock counter 118 generates and updates the counter value CNT2 according to the reference clock CLK2. At step 214, the electronic device 100 decides to leave the low power mode. At step 216, the electronic device 100 enters the full power mode by switching on the power domain PD1, and stops the simple clock counter 118. At step 218, the electronic device 100 generates the unit-time counter value CNT_UT, restores the counter value CNT1 (CNT1=CNT_BK) from the volatile memory 120, updates the restored counter value CNT1 according to the counter value CNT2 and the unit-time counter value CNT_UT (e.g., CNT1=CNT1+CNT2×CNT_UI), and resumes the native clock counter 110 with the updated counter value CNT1.

Figure 3:
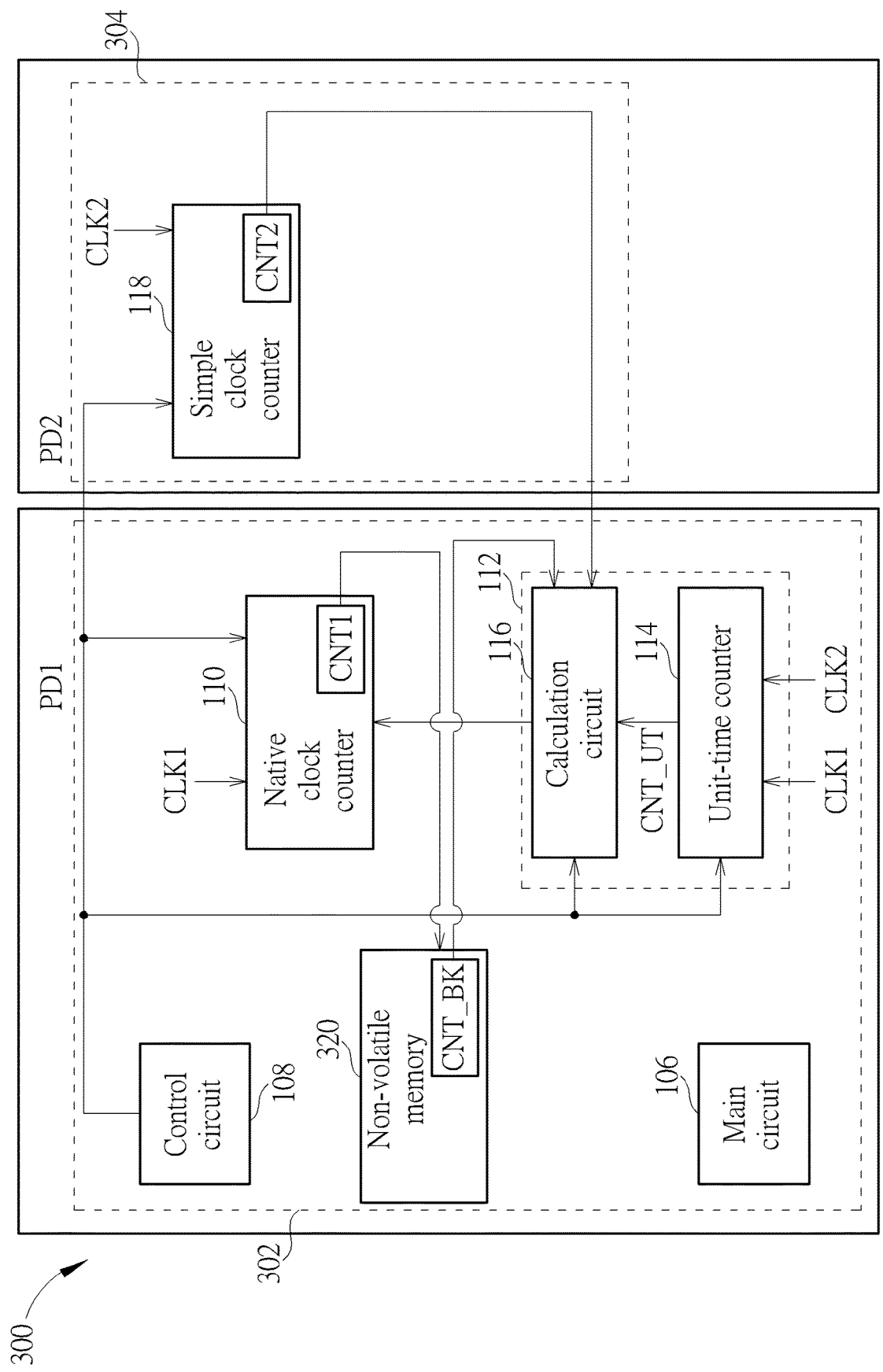
FIG. 3 is a diagram illustrating a second electronic device according to an embodiment of the present invention.

FIG. 3 is a diagram illustrating a second electronic device according to an embodiment of the present invention. By way of example, but not limitation, the electronic device 300 may be a wireless communication device (e.g., a Bluetooth device), and may employ the proposed clock management method for maintaining a native clock (e.g., a Bluetooth native clock) needed for achieving synchronization between the electronic device 300 and another electronic device (e.g., a peer Bluetooth device). The major difference between the electronic devices 100 and 300 is that the volatile memory 120 allocated in the power domain PD2 is replaced with a non-volatile memory (e.g., a flash memory) 320 allocated in the power domain PD1. That is, the volatile memory 120 is omitted from the circuit block 304 allocated in the power domain PD2, and the non-volatile memory 320 is added to the circuit block 302 allocated in the power domain PD1. Like the embodiment shown in FIG. 1, the power domain PD2 remains switched on for allowing the simple clock counter 118 to update its counter value CNT2 during a period in which the power domain PD1 is switched off for power saving. When the power domain PD1 is switched off, the native clock counter 110 is powered down and then loses the counter value CNT1. In this embodiment, the non-volatile memory 320 is allocated in the power domain PD1, and is arranged to store a backup CNT_BK of the counter value CNT1 generated by the native clock counter 110 (i.e., CNT_BK=CNT1) before a start time of the period (i.e., before the power domain PD1 is switched off), and the updating circuit 112 (particularly, calculation circuit 116 of updating circuit 112) is further arranged to restore the counter value CNT1 by reading the backup CNT_BK from the non-volatile memory 320 after an end time of the period (i.e., after the power domain PD1 is switched on again). The same objective of resuming the native clock counter 110 with the updated counter value CNT1 after the power domain PD1 is switched on again can be achieved. Since a person skilled in the art can readily understand principles of the electronic device 300 after reading above paragraphs directed to the electronic device 100 shown in FIG. 1 and the clock management method shown in FIG. 2, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device comprising:
   a first circuit block, allocated in a first power domain, wherein the first circuit block comprises:
      a first clock counter, arranged to generate a first counter value according to a first reference clock; and
      an updating circuit, arranged to receive a second counter value, and update the first counter value according to the second counter value; and
   a second circuit block, allocated in a second power domain, wherein the second circuit block comprises:
      a second clock counter, arranged to generate the second counter value according to a second reference clock;
   wherein the first power domain and the second power domain are controlled independently, and the updating circuit comprises:
      a unit-time counter, arranged to generate a unit-time counter value by counting a unit time of the second reference clock according to the first reference clock, wherein a frequency of the first reference clock is higher than a frequency of the second reference clock; and
      a calculation circuit, arranged to update the first counter value according to the second counter value and the unit-time counter value.

2. The electronic device of claim 1, wherein the second power domain remains switched on during a period in which the first power domain is switched off.

3. The electronic device of claim 2, wherein the second circuit block further comprises:
   a volatile memory, arranged to store a backup of the first counter value generated by the first clock counter before a start time of the period; and
   the updating circuit is further arranged to restore the first counter value by reading the backup from the volatile memory after an end time of the period.

4. The electronic device of claim 2, wherein the first circuit block further comprises:
   a non-volatile memory, arranged to store a backup of the first counter value generated by the first clock counter before a start time of the period; and
   the updating circuit is further arranged to restore the first counter value by reading the backup from the non-volatile memory after an end time of the period.

5. The electronic device of claim 1, wherein the electronic device is a wireless communication device.

6. The electronic device of claim 5, wherein the wireless communication device is a Bluetooth device.

7. A clock management method comprising:
   using a first clock counter allocated in a first power domain for generating a first counter value according to a first reference clock;
   using a second clock counter allocated in a second power domain for generating a second counter value according to a second reference clock;
   using an updating circuit allocated in the first power domain for receiving the second counter value and updating the first counter value according to the second counter value; and
   controlling the first power domain and the second power domain independently;
   wherein using the updating circuit allocated in the first power domain for receiving the second counter value and updating the first counter value according to the second counter value comprises:
      generating a unit-time counter value by counting a unit time of the second reference clock according to the first reference clock, wherein a frequency of the first reference clock is higher than a frequency of the second reference clock; and
      updating the first counter value according to the second counter value and the unit-time counter value.

8. The clock management method of claim 7, wherein controlling the first power domain and the second power domain independently comprises:
   keeping the second power domain switched on during a period in which the first power domain is switched off.

9. The clock management method of claim 8, further comprising:
   before a start time of the period, storing a backup of the first counter value in a volatile memory allocated in the second power domain;
   wherein using the updating circuit allocated in the first power domain for receiving the second counter value and updating the first counter value according to the second counter value comprises:
      after an end time of the period, restoring the first counter value by reading the backup from the volatile memory.

10. The clock management method of claim 8, further comprising:
    before a start time of the period, storing a backup of the first counter value in a non-volatile memory allocated in the first power domain;
    wherein using the updating circuit allocated in the first power domain for receiving the second counter value and updating the first counter value according to the second counter value comprises:
       after an end time of the period, restoring the first counter value by reading the backup from the non-volatile memory.

11. The clock management method of claim 7, wherein the clock management method is employed by a wireless communication device.

12. The clock management method of claim 11, wherein the wireless communication device is a Bluetooth device.

* * * * *